United States Patent
Shi et al.

(10) Patent No.: US 6,983,269 B2
(45) Date of Patent: Jan. 3, 2006

(54) APPARATUS FOR INDIRECT DIRECTORY SEARCHES AND METHOD THEREFOR

(75) Inventors: Shepherd Shi, Austin, TX (US); Reginal R. Hill, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 119 days.

(21) Appl. No.: 09/740,226

(22) Filed: Dec. 19, 2000

(65) Prior Publication Data

US 2002/0078005 A1 Jun. 20, 2002

(51) Int. Cl.
*G06F 17/30* (2006.01)

(52) U.S. Cl. .............................................. 707/2; 707/10
(58) Field of Classification Search ............. 707/103 R, 707/103 Z, 1, 2, 3, 10
See application file for complete search history.

(56) References Cited

U.S. PATENT DOCUMENTS

| | | | | |
|---|---|---|---|---|
| 5,737,732 A | * | 4/1998 | Gibson et al. ................ 707/2 |
| 5,774,552 A | * | 6/1998 | Grimmer ..................... 380/25 |
| 6,041,053 A | * | 3/2000 | Douceur et al. ............ 370/389 |
| 6,085,188 A | * | 7/2000 | Bachmann et al. ............ 707/3 |
| 6,260,039 B1 | * | 7/2001 | Schueck et al. ............. 707/10 |
| 6,366,954 B1 | * | 4/2002 | Traversal et al. .......... 709/220 |
| 6,434,556 B1 | * | 8/2002 | Levin et al. ................... 707/5 |
| 6,587,874 B1 | * | 7/2003 | Golla et al. ................. 709/220 |
| 2001/0011277 A1 | * | 8/2001 | Martin et al. ............... 707/100 |

* cited by examiner

Primary Examiner—Safet Metjahic
Assistant Examiner—Brian Goddard
(74) Attorney, Agent, or Firm—Barry S. Newberger; Jeffrey S. LaBaw

(57) ABSTRACT

A system and method for performing an indirect directory search is implemented. In the indirect search, entry attributes that reference other objects may selectively be searched. An attribute syntax for a distinguished name (DN) which is a reference is defined. If an attribute value belonging to an attribute corresponding to the reference syntax is in an entry found by the search, the value points to another entry in the directory. The attributes (members) of the entry pointed to are selectively retrieved, depending on parameters in the search request.

18 Claims, 5 Drawing Sheets

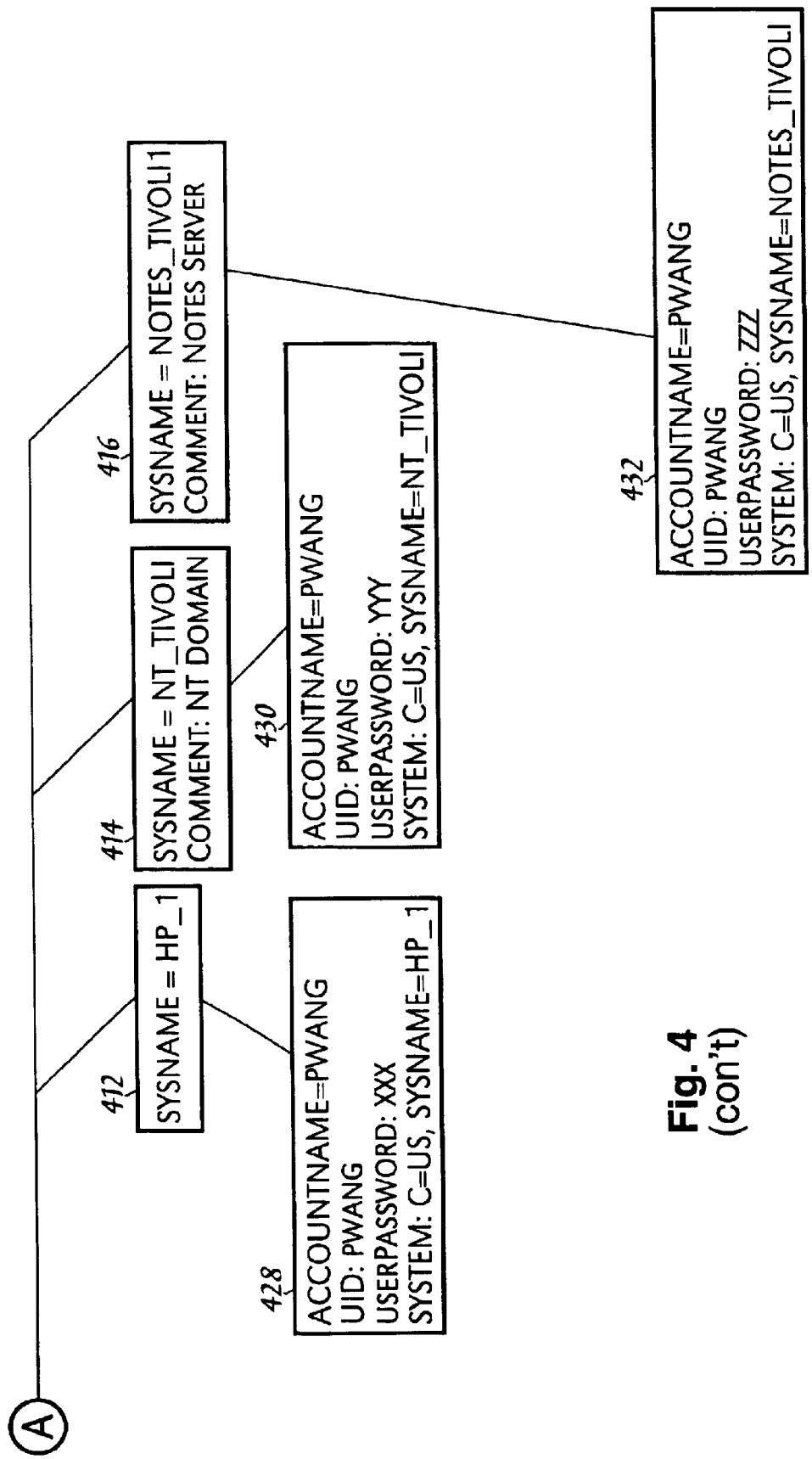
Fig. 4 (con't)

APPARATUS FOR INDIRECT DIRECTORY SEARCHES AND METHOD THEREFOR

CROSS REFERENCE TO RELATED APPLICATION

The present invention is related to the following U.S. Patent Application which is hereby incorporated herein by reference: Ser. No. 09/740,251 entitled "Data Processing System and Method For Multi-Level Directory Searches" now U.S. Pat. No. 6,625,615.

TECHNICAL FIELD

The present invention relates in general to data processing systems, and in particular, to directory searching in data processing systems.

BACKGROUND INFORMATION

Information describing the various users, applications, files, printers and other resources accessible in a multi-user environment is often collected into a special database which may be referred to as a directory. The Lightweight Directory Access Protocol (LDAP) is an open architecture set of protocols for accessing and updating information in a directory. (LDAP version 2 is defined in Request for Comments (RFC) 1777, and LDAP version 3 is specified in RFC 2251, December 1997 (copyright, The Internet Society, 1997)). RFC 1777 and RFC 2251 are hereby incorporated herein by reference.

In the LDAP, the basic unit of information stored in the directory is referred to as an entry. Entries represent objects of interest, for example, in a multi-user dataprocessing system environment, people, servers, organizations, etc. Entries are composed of a collection of attributes that contain information about the object. Every attribute has a type and one or more values. Attribute types are associated with a syntax. The syntax specifies what kind of value can be stored. Directory entries are arranged in a tree structure or hierarchy. (Entries may also be referred to as nodes, and the terms may be used interchangeably herein.) The organization of the tree structure and the type of objects that can be stored in the directory as well as their attributes are defined in the schema for the objects. The set of schema defining a particular directory provides a road map to the organization of the directory. (Note, that the schema do not refer to the instances of entries in a particular directory.) Additionally, the data store that contains the information constituting the directory may be implemented using a multiplicity of mechanisms. The LDAP itself does not specify a particular storage mechanism. For example, the directory storage mechanism may be implemented using flat files, a binary tree (b-tree) or a relational database.

Directory entry information is retrieved by formulating an LDAP search. A search within the directory hierarchy is specified in LDAP by a "distinguished name" (DN). A DN (discussed further hereinbelow) is a unique name that unambiguously identifies a single entry within the directory hierarchy. The value of an attribute associated with a particular entry may itself be a DN. If information in the entries referred to by these DNs is to be retrieved, the distinguish name constituting the value of the attribute in the first search must be retrieved, and a new search initiated. For each such DN contained in an entry, a separate search must be performed. Consequently, there is a need in the art for mechanisms for retrieving directory information associated with a referenced object in another directory entry that do not necessitate the initiation of multiple search requests.

SUMMARY OF THE INVENTION

The aforementioned needs are addressed by the present invention. Accordingly, there is provided, in a first form, a search method. The method determines if a first parameter has a first predetermined value. If the first parameter has said first predetermined value, the method returns a value of each of one or more selected members of a first node, said first node being referenced by a value of a first member of a second node in response to said first member of said second node having a predetermined type.

There is also provided, in a second form, a computer program product. The program product includes a program of instructions for determining if a first parameter has a first predetermined value. The program product also contains instructions for returns a value of each of one or more selected members of a first node, said first node being referenced by a value of a first member of a second node in response to said first member of said second node having a predetermined type, if the first parameter has the first predetermined value.

Additionally there is provided, in a second form, a data processing system. The system has circuitry operable for determining if a first parameter has a first predetermined value. Also included is circuitry operable for, if the first parameter has the first predetermined value, returning a value of each of one or more selected members of a first node, the first node being referenced by a value of a first member of a second node in response to the first member of the second node having a predetermined type.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
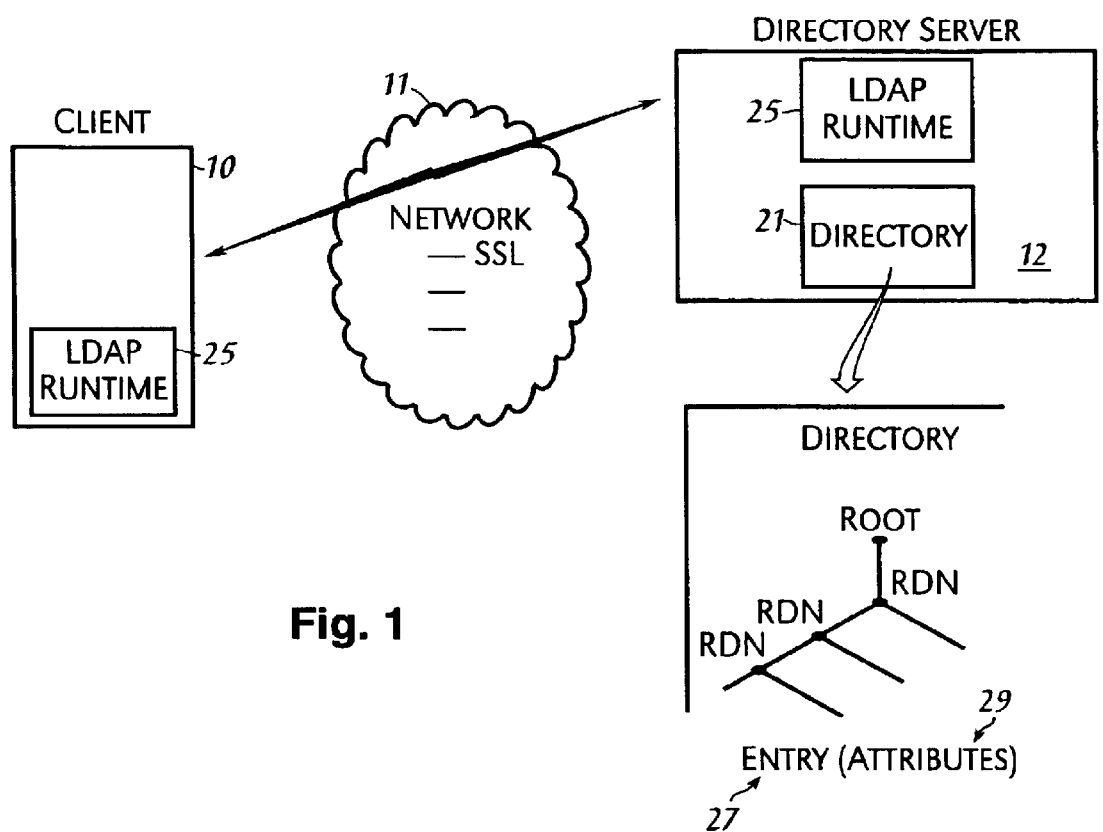
FIG. 1 illustrates a representative LDAP directory service system.

The present invention provides a system and method for performing an indirect directory search in which entry attributes that reference other objects may selectively be searched. An attribute syntax for a distinguished name (DN) which is a reference is defined. If an attribute value belonging to an attribute corresponding to the reference syntax is in an entry found in the search, the value is a pointer to another entry in the directory. The attributes (members) of the entry pointed to may be selectively retrieved, in accordance with parameters in the search request.

In the following description, numerous specific details are set forth such as specific distinguished names, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted in as much as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

A block diagram of a representative LDAP directory service in which the present invention may be implemented is shown in FIG. 1. A previously described, LDAP is the lightweight directory access protocol. This protocol may be implemented as either a front end to the X.500 directory service, or as a standalone directory service. According to the protocol, a client machine 10 makes a TCP/IP connection to an LDAP server 12 through network 11, sends requests and receives responses. LDAP server 12 supports a directory 21 as illustrated in a simplified form in FIG. 1. Each of the client and server machines further include a directory "runtime" component 25 for implementing the directory service operations as will be described below. As previously discussed, the directory 21 is based on the concept of an "entry" 27, which contains information about some object (e.g., a person). Entries are composed of attributes 29, which have a type and one or more values. Each attribute 29 has a particular syntax that determines what kinds of values are allowed in the attribute (e.g., ASCII text, binary characters, and the like) and how these values are constrained during a particular directory operation.

The directory tree (referred to in the LDAP as the Directory Information Tree (DIT)) is organized in a predetermined manner, with each entry uniquely named relative to its sibling entries by a "relative distinguished name" (RDN). An RDN is derived from the attributes of the corresponding directory entry. An RDN may typically have the form <attribute name>=<attribute value>. According to the protocol, a globally unique name for an entry, the distinguished name (DN), may be a concatenation of the RDN sequence from a given entry to the tree root. RDNs, and DNs will be further discussed hereinbelow, in the context of an LDAP search, in conjunction with FIG. 4.

Figure 2:
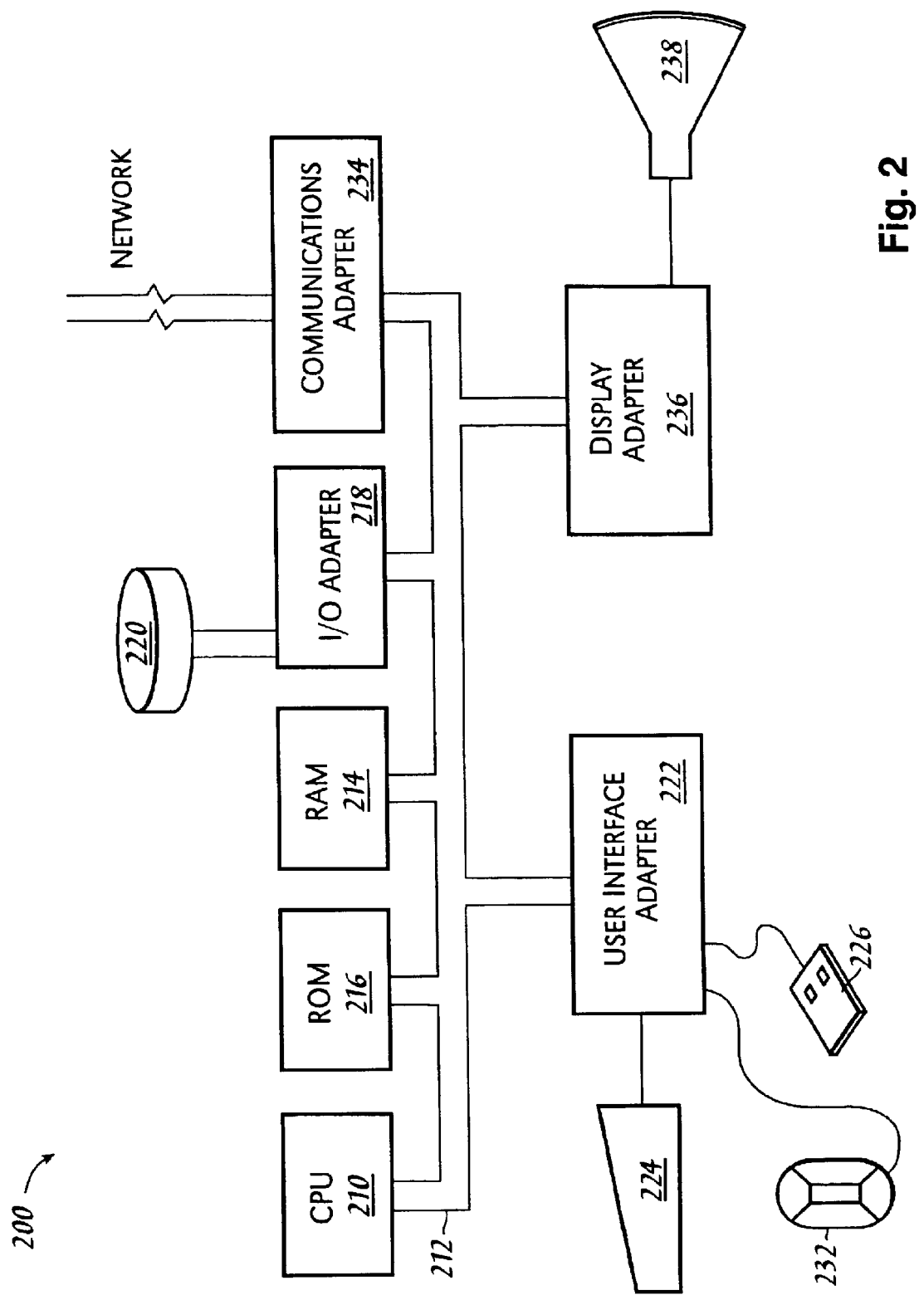
FIG. 2 illustrates, in block diagram form, a data processing system implemented in accordance with an embodiment of the present invention.

Referring now to FIG. 2, an example is shown of a data processing system 200 which may be used for the invention. System 200 may, for example, be used in an embodiment of client 10, or server 12, FIG. 1. The system has a central processing unit (CPU) 210, which is coupled to various other components by system bus 212. Read only memory ("ROM") 216 is coupled to the system bus 212 and includes a basic input/output system ("BIOS") that controls certain basic functions of the data processing system 200. Random access memory ("RAM") 214, I/O adapter 218, and communications adapter 234 are also coupled to the system bus 212. I/O adapter 218 may be a small computer system interface ("SCSI") adapter that communicates with a disk storage device 220. Communications adapter 234 interconnects bus 212 with an outside network enabling the data processing system to communicate with other such systems. Input/Output devices are also connected to system bus 212 via user interface adapter 222 and display adapter 236. Keyboard 224, track ball 232, mouse 226 and are all interconnected to bus 212 via user interface adapter 222. (An artisan of ordinary skill would appreciate that implementation of system 200 as a server, such as server 12, FIG. 1, may omit one or more I/O devices.) Display monitor 238 is connected to system bus 212 by display adapter 236. In this manner, a user is capable of inputting to the system throughout the keyboard 224, trackball 232 or mouse 226 and receiving output from the system via display 238.

Preferred implementations of the invention include implementations as a computer system programmed to execute the method or methods described herein, and as a computer program product. According to the computer system implementation, sets of instructions for executing the method or methods are resident in the random access memory 214 of one or more computer systems configured generally as described above. Until required by the computer system, the set of instructions may be stored as a computer program product in another computer memory, for example, in disk drive 220 (which may include a removable memory such as an optical disk or floppy disk for eventual use in the disk drive 220). Further, the computer program product can also be stored at another computer and transmitted when desired to the user's work station by a network or by an external network such as the Internet. One skilled in the art would appreciate that the physical storage of the sets of instructions physically changes the medium upon which it is stored so that the medium carries computer readable information. The change may be electrical, magnetic, chemical, biological, or some other physical change. While it is convenient to describe the invention in terms of instructions, symbols, characters, or the like, the reader should remember that all of these and similar terms should be associated with the appropriate physical elements.

Note that the invention may describe terms such as comparing, validating, selecting, identifying, or other terms that could be associated with a human operator. However, for at least a number of the operations described herein which form part of at least one of the embodiments, no action by a human operator is desirable. The operations described are, in large part, machine operations processing electrical signals to generate other electrical signals.

Figure 3:
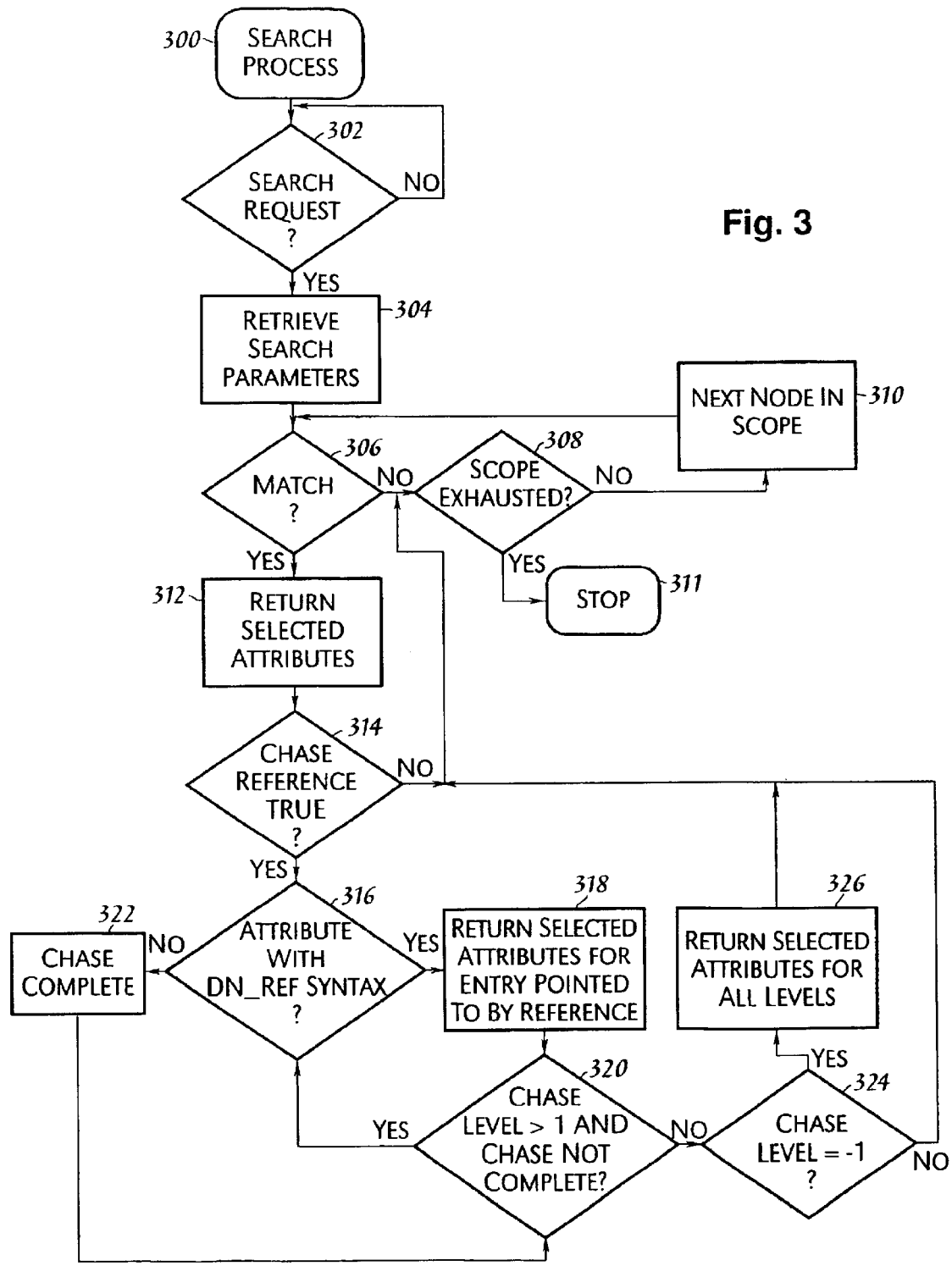
FIG. 3 illustrates, in flowchart form, a methodology in accordance with an embodiment of the present invention.

Refer now to FIG. 3 illustrating, in flowchart form, indirect search process 300 in accordance with the principles of the present invention. In step 302, process 300 waits for a search request. Search requests in an LDAP message as defined in the LDAP Specification, RFC 2251. If a search request is received, the search parameters are retrieved from the request, step 304. Recall that the directory structure is in the form of a tree, the DIT, in which each node is uniquely named relative to its siblings by an RDN. Each node may be identified by a globally unique name, the DN, formed by concatenating, in accordance with a syntax specified in the LDAP, RDNs. An LDAP search is specified by a set of parameter values. The starting point of the search, called the base object, is specified by a DN for the base object. (The base object is a node within the DIT.) Additionally, the LDAP search parameters may include the search scope. The scope defines the depth of the search within the DIT relative to the base object. In an embodiment of the present invention in accordance with the LDAP, the search may be limited to the base object. Additionally, the scope may specify a single level wherein the immediate children of the base object are also searched. The search scope may also be subtree. In a search having subtree scope, the base object and all descendants thereof are searched. Additionally, the search parameters may include a search filter. The search filter specifies the criteria that an entry must match to be returned from a search. The search filter is a boolean combination of attribute value assertions. An attribute value assertion tests the value of an attribute for equality, less than or equal, etc. A search request may also specify the attributes to be returned. This parameter lists which attributes are to be retrieved from entries that match the search criteria.

A search request in accordance with the principles of the present invention also may include parameters for selectively enabling objects referenced in an entry to also be searched. A chase reference parameter constitutes a "flag" which enables a search of attribute values constituting a reference to another object in the DIT. (A client application in accordance with the principles of the present invention may initiate a search by invoking an Applications Program Interface (API) which includes the aforementioned parameters in the API call. An API for performing LDAP operations is discussed in the commonly owned U.S. Pat. No. 6,085,188 of Bachmann, et al. which is hereby incorporated in its entirety herein by reference. Additionally, a schema in accordance with the principles of the present invention defines a DN_Ref syntax. The DN_Ref syntax may have the same format as the DN syntax. Attribute types having the DN_Ref syntax maybe used to retrieve the objects painted to by the value of the attribute belonging to such an attribute type. The value corresponds to a referenced object in the DIT. This will be discussed further hereinbelow in conjunction with step 308. The search parameters in accordance with the principles of the present invention also include a chase level. The chase level may be used to specify how many levels of referenced objects will be returned. This will also be discussed further hereinbelow.

In step 306, it is determined if an object within the scope of the search (as specified in the scope parameter retrieved in step 304) matches the value in the filter parameter of the request. If not, in step 308 it is determined if the search scope is exhausted, and if not, methodology 300 searches the next node in the scope, step 310. The process loops over steps 306–310 until either a match is found, or the scope is exhausted, wherein the process terminates, step 311.

If, however, in step 306 a match is found, in step 312, the selected attributes (in accordance with the attribute list in the attribute parameter retrieved in step 304) are returned.

As discussed above, the search request may set a chase reference parameter. In step 314, it is determined if the chase reference parameter is "TRUE". If so, in step 316 it is determined if any attributes in the base object are attribute types having the DN_Ref syntax. This may be determined, for example, by reference to the schema for each attribute type appearing in the entry for the base object, that is, the entry having the DN retrieved from the search request in step 304. This may be understood by considering a specific example with reference to FIG. 4 which schematically illustrates a simplified DIT 400 in accordance with the principles of the present invention. DIT 400 includes a plurality of nodes 402–432. Node 402 is the root node. Two child nodes of root 402, nodes 404 and 406 contain the country (C) attribute having the values "GB" (Great Britain) and US (United States). Node 406 has two child nodes, node 408 and node 410. Node 408 includes the office (O) attribute having the value "IBM" and node 410 has the O attribute having the value "NETSCAPE". Additionally, node 406 has three child nodes, 412, 414 and 416, each containing the attribute "SYSNAME" with values "HP_1", "NT_TIVOLI" and "NOTES_TIVOLI". (Recall that the RDN for anode is an attribute of the node. The attribute that is the RDN is written in the form <ATTRIBUTE TYPE>=<ATTRIBUTE VALUE>. Other attributes are written in the form <Attribute Type>:<Attribute Value>).

Nodes (equivalently entries) 414 and 416 also include the Comment attribute type. The value of the Comment attribute in node 414 is "NT Domain" and the value of the Comment attribute in entry 416 is "Notes Server." (Note that entries inherit the attributes of the nodes from which they descend. Thus, for example, nodes 414–416 include the inherited Country attribute having the value "US." Inherited attributes are not shown in FIG. 4.)

Node 408 has two child nodes 418 and 420. Each of nodes 418 and 420 includes the Organizational Unit (OU) attribute type. The value of the OU attribute in node 418 is "IBM AUSTIN." The value of the OU attribute in node 420 is "TIVOLI." Node 418 has further child nodes, nodes 422 and 424. Each of these includes the Common Name (CN) attribute type with the respective values "JOHN FOO" and "MARY BUR." Similarly, node 420 has a child node 426 with the CN attribute value PETER WANG." Additionally, node 426 includes three attributes of type "Account." In accordance with the principles of the present invention, the Account attribute type has the DN_Ref syntax. Referring again to nodes 412, 414 and 416, note that each of nodes 412, 414 and 416 has a corresponding child node, node 428, 430 and 432, respectively. Node 428 has an RDN "ACCOUNTNAME=PWANG." Similarly, nodes 430 and 432 have an RDN ACCOUNTNAME=PWANG. However, in accordance with the LDAP, each of nodes 428, 430 and 432 has a unique DN which corresponds to the value of one of the Account attributes in node 426.

Figure 4:
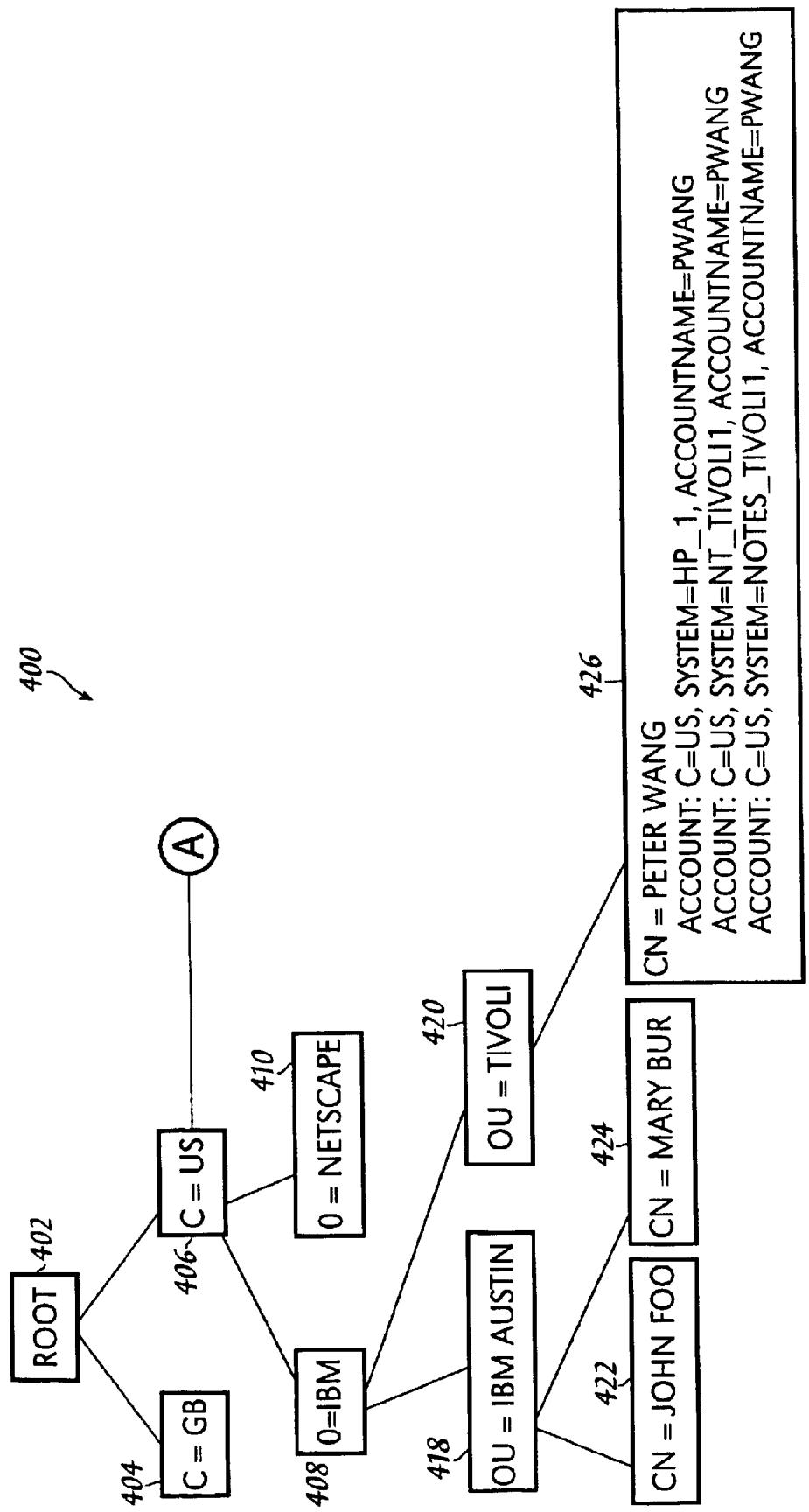
FIG. 4 schematically illustrates a simplified directory which may be used in an embodiment in accordance with the principles of the present invention.

Thus, returning to FIG. 3, step 308, in the exemplary DIT of FIG. 4, the Account attributes in node 426, each have the DN_Ref syntax. Consequently, a search request, received in step 302, the scope of which (in accordance with the parameters retrieved in step 304) which reached to node 426 and which matched a search filter (also retrieved in step 304) would, because at least one attribute (the Account attributes in the node found) satisfied the condition in decision block 316, search process 300 would proceed by the "Yes" branch of step 316.

Process 300, in step 318, returns the attributes for each entry pointed to by the value, of each attribute having the DN_Ref syntax determined in step 316. Note that the attributes returned instep 318 would be selected in accordance with the search parameter attribute list retrieved from the search request in step 304. Referring to the exemplary DIT 400 in FIG. 4 and assuming, for the purposes of illustration, that the list of attributes to be returned from each matching entry is empty, wherein all attributes of each entry will be returned in accordance with the LDAP specification, step 318 will return the three attributes in each of nodes 428, 430 and 432. That is, the attribute value "PWANG" of the ACCOUNTNAME attribute, the value of the User Identifier (UID) attribute ("pwang") and the value "xxx" of the "UserPassword" attribute will be returned from entry 428. The values of the corresponding attributes from nodes 430 and 432 will similarly be returned, in step 318. Note that if the attribute list search parameter, retrieved in step 304, was not empty, an subset of the attributes in entries 428, 430 and 432 would be returned. For example, if the attribute list specified the UserPassword attribute, only the values of that attribute, "xxx," "yyy" and "zzz," respectively, would be returned in step 318. (It would be understood by an artisan of ordinary skill that retrieval of attributes such as the UserPassword attribute may be precluded by other considerations, such as access controls. For the purpose of illustration herein, it is assumed that access to the UserPassword attribute is not so restricted.)

Methodology 300 may "chase" all references appearing as attribute values depending on the value of the chase level parameter received in the search request, as discussed hereinabove. This may be performed by looping over steps 316–320. In step 320 it is determined if the value of the chase level parameter is greater than one and the chase not complete. If, in step 320, the value of the chase level parameter is greater than one and the chase is incomplete, process 300 returns to step 316 and if, any attributes in the current reference which had been returned in step 318 are in the DN_Ref syntax then, step 316 returns to step 318 to return the attributes for those references. If, however, in step 316 there are no attributes having the DN_Ref syntax, then the chase is complete, step 322, wherein step 320 falls through the "No" branch. (Step 314 may be performed, for example, by setting a flag, which flag is tested in step 320, and which flag may be set when the aforementioned chase level counter reaches a predetermined count, such as zero. However, other implementations of steps 316–322 would be within the knowledge of ordinarily skilled artisans in the data processing arts, and such implementations would be in the spirit and scope of the present invention.)

In step 324, it is determined if the value of the chase level parameter is −1. If step 320 fell through the "No" branch because a chase having a chase level greater than one completed, then necessarily the value of the chase level cannot be −1, and step 316 also falls through the "No" branch. If, however, step 320 fell through the "No" branch because the chase level was not greater than one (that is, either zero or a negative value) then it is determined, in step 324, if the chase level is −1. (An artisan of ordinary skill would understand that alternative embodiments of the present invention may implement other decision values for the chase level parameter, which embodiments would be within the spirit and scope of the present invention.) If so, then in step 326 the selected attributes, in the attributes parameter retrieved from the search request in step 304, are returned for all nodes pointed to by a reference, that is a value of an attribute having the DN_Ref syntax. 1f however, the value of the chase level parameter is not −1, step 326 is bypassed.

Process 300 returns to step 308 to complete the search in accordance with the value of the scope parameter in the search request, as previously discussed above.

In this way a methodology for searching references without having to retrieve a DN of a referenced object and issue a base search on each object is provided. A predetermined syntax for a reference attribute is specified within the directory scheme. The values of instances of reference type attributes provide a pointer to the referenced object which pointer may be used to return the attributes of referenced objects. The depth to which referenced objects are chased may be specified in the search request.

Although the present invention and its advantages have been described in detail, it should be understood that various changes, substitutions and alterations can be made herein without departing from the spirit and scope of the invention as defined by the appended claims.

What is claimed is:

1. A method for retrieving directory information associated with a referenced object in another directory entry in a single search comprising the steps of:
   receiving a request to search a directory structure, wherein said request comprises a first distinguished name to identify a first entry in said directory structure, wherein said request specifies a particular number of levels in said directory structure;
   identifying said first entry in said directory structure referenced by said first distinguished name, wherein said first entry contains an attribute referencing a second entry in said directory structure; and
   retrieving directory information from said second entry without performing a new search, wherein said second entry is located within said specified number of levels from said first entry in said directory structure.

2. The method as recited in claim 1, wherein said attribute in said first entry comprises a pointer to said second entry.

3. The method as recited in claim 1, wherein said attribute in said first entry comprises a second distinguished name.

4. The method as recited in claim 3, wherein said second entry in said directory structure is identified by said second distinguished name.

5. The method as recited in claim 1, wherein said request comprises a Lightweight Directory Access Protocol (LDAP) request.

6. The method as recited in claim 1, wherein said directory structure is a Lightweight Directory Access Protocol (LDAP) structure.

7. A computer program product embodied in a machine readable medium for retrieving directory information associated with a referenced object in another directory entry in a single search comprising the programming steps of:
   receiving a request to search a directory structure, wherein said request comprises a first distinguished name to identify a first entry in said directory structure, wherein said request specifies a particular number of levels in said directory structure;
   identifying said first entry in said directory structure referenced by said first distinguished name, wherein said first entry contains an attribute referencing a second entry in said directory structure; and
   retrieving directory information from said second entry without performing a new search, wherein said second entry is located within said specified number of levels from said first entry in said directory structure.

8. The computer program product as recited in claim 7, wherein said attribute in said first entry comprises a pointer to said second entry.

9. The computer program product as recited in claim 7, wherein said attribute in said first entry comprises a second distinguished name.

10. The computer program product as recited in claim 9, wherein said second entry in said directory structure is identified by said second distinguished name.

11. The computer program product as recited in claim 7, wherein said request comprises a Lightweight Directory Access Protocol (LDAP) request.

12. The computer program product as recited in claim 7, wherein said directory structure is a Lightweight Directory Access Protocol (LDAP) structure.

13. A system, comprising:
   a memory unit operable for storing a computer program for retrieving directory information associated with a referenced object in another directory entry in a single search; and
   a processor coupled to said memory unit, wherein said processor, responsive to said computer program, comprises:
      circuitry for receiving a request to search a directory structure, wherein said request comprises a first distinguished name to identify a first entry in said directory structure, wherein said request specifies a particular number of levels in said directory structure;

circuitry for identifying said first entry in said directory structure referenced by said first distinguished name, wherein said first entry contains an attribute referencing a second entry in said directory structure; and circuitry for retrieving directory information from said second entry without performing a new search, wherein said second entry is located within said specified number of levels from said first entry in said directory structure.

14. The system as recited in claim 13, wherein said attribute in said first entry comprises a pointer to said second entry.

15. The system as recited in claim 13, wherein said attribute in said first entry comprises a second distinguished name.

16. The system as recited in claim 15, wherein said second entry in said directory structure is identified by said second distinguished name.

17. The system as recited in claim 13, wherein said request comprises a Lightweight Directory Access Protocol (LDAP) request.

18. The system as recited in claim 13, wherein said directory structure is a Lightweight Directory Access Protocol (LDAP) structure.

* * * * *